US012773065B2

(12) United States Patent
Dunker

(10) Patent No.: US 12,773,065 B2
(45) Date of Patent: Oct. 27, 2026

(54) GRIDDLE COOKING DEVICE, SYSTEM AND METHOD THEREOF

(71) Applicant: North Atlantic Imports, LLC, Logan, UT (US)

(72) Inventor: John C. Dunker, Providence, UT (US)

(73) Assignee: North Atlantic Imports, LLC, Providence, UT (US)

( * ) Notice: Subject to any disclaimer, the term of this patent is extended or adjusted under 35 U.S.C. 154(b) by 569 days.

(21) Appl. No.: 18/133,384

(22) Filed: Apr. 11, 2023

(65) Prior Publication Data

US 2023/0320527 A1 Oct. 12, 2023

Related U.S. Application Data

(60) Provisional application No. 63/330,230, filed on Apr. 12, 2022.

(51) Int. Cl.
*A47J 37/06* (2006.01)
*A47J 36/00* (2006.01)
*F24C 15/14* (2006.01)

(52) U.S. Cl.
CPC ........... *A47J 37/0682* (2013.01); *A47J 36/00* (2013.01); *F24C 15/14* (2013.01)

(58) Field of Classification Search
CPC .. A47J 37/067; A47J 37/0676; A47J 37/0682; A47J 37/0786; F24C 15/10; F24C 15/14
USPC .................................................... 99/425, 446
See application file for complete search history.

(56) References Cited

U.S. PATENT DOCUMENTS 4,862,795 A 9/1989 Hawkins
6,053,160 A * 4/2000 Scarborough ....... A47J 37/0786 126/41 R
6,205,995 B1 * 3/2001 Odenwald ................. F24C 3/14 99/425
6,237,472 B1 * 5/2001 Gates .................. A47J 37/0786 99/450
6,463,924 B1 * 10/2002 Osterman ........... A47J 37/0786 126/41 R
D694,056 S 11/2013 Dahle
10,327,588 B2 6/2019 Dahle et al.
10,327,589 B1 6/2019 Dahle et al.
10,588,461 B2 3/2020 Dahle
10,660,473 B2 5/2020 Dahle et al.
10,912,412 B2 2/2021 Thunga
(Continued)

*Primary Examiner* — Brian W Jennison
(74) *Attorney, Agent, or Firm* — David L. Stott

(57) ABSTRACT

A cooking station configured to manage food byproduct. The cooking station may include an insert type framework for positioning within a cabinet type structure. The cooking station includes a framework, a griddle and a grease container. The framework is made to support the griddle thereon such that the griddle includes a splash guard and an opening positioned adjacent a rear side of the griddle and the splash guard, the opening configured to drain food byproduct therethrough and into the grease container. The grease container includes an upward extension that is unattached so as to extend freely along the rear side of the splash guard. The extension is viewable, while standing along a front side of the griddle, so that the user can readily view, grab and pull the extension to, thereby, pull the grease container up from a cradle positioned below the griddle along a rear side of the framework.

14 Claims, 7 Drawing Sheets

(56) References Cited

U.S. PATENT DOCUMENTS

| | | | |
|---|---|---|---|
| D975,491 S | 1/2023 | Shen | |
| 11,583,136 B1 | 2/2023 | Blum | |
| 11,730,316 B2 * | 8/2023 | Simon | A47J 37/067 99/425 |
| 2014/0231009 A1 | 8/2014 | Chitnavis et al. | |
| 2014/0352551 A1 | 12/2014 | Ducate et al. | |
| 2019/0365152 A1 | 12/2019 | Dahle et al. | |
| 2020/0008615 A1 | 1/2020 | Dahle et al. | |
| 2020/0093330 A1 | 3/2020 | Dahle et al. | |
| 2021/0007550 A1 | 1/2021 | Puertas et al. | |
| 2021/0244233 A1 | 8/2021 | Bush, III et al. | |
| 2021/0315416 A1 | 10/2021 | Fullmer et al. | |
| 2022/0022688 A1 | 1/2022 | Barajas, Jr. et al. | |
| 2022/0071445 A1 | 3/2022 | Springer | |
| 2022/0322876 A1 | 10/2022 | Ledet | |

* cited by examiner

GRIDDLE COOKING DEVICE, SYSTEM AND METHOD THEREOF

CROSS-REFERENCE TO RELATED APPLICATIONS

This application claims the benefit of U.S. Provisional Application No. 63/330,230, filed Apr. 12, 2022, the disclosure of which is hereby incorporated by reference herein in its entirety.

TECHNICAL FIELD

The present invention relates generally to cooking stations and, more specifically, the present invention relates to managing grease and food byproduct with cooking stations.

BACKGROUND

Barbequing has become a popular and pervasive tradition in much of the world. A barbeque grill is a device for cooking food by applying heat directly below a grill. There are several varieties of grills but most fall into one of two categories, either gas fueled or charcoal. Gas fueled grills typically use propane or natural gas as a fuel source, with the gas flame either cooking the food directly or heating grilling elements which in turn radiate the heat necessary to cook the food. Grilling has become a popular method of cooking food due to the unique flavors and texture imparted to the food during the grilling process.

A griddle is a cooking device consisting of a broad flat surface that can be heated using a variety of means and is used in both residential and commercial applications for a variety of cooking operations. The griddle is most commonly a flat metal plate composed of cast or wrought iron, aluminum or carbon steel. Griddles are commonly heated directly or indirectly by open flame or electrical elements. Using a griddle placed directly on a barbeque grill or over flame burners has also become popular when cooking foods not as well suited for cooking directly on a grill over an open flame.

One concern with griddle cooking is the grease and byproduct build-up that inevitably occurs. Some griddles include a drain system to manage the grease either on the side or front of the griddle. Such locations keep the grease and byproduct in areas relative to the griddle and cook station that are viewable and in the region where the user is cooking, which is unsightly and still provides the potential for grease to spill and build-up over the front side of the cooking station. Further, this grease build-up will often spread to the user's clothing.

BRIEF SUMMARY OF THE INVENTION

The present invention is directed to various embodiments of an outdoor cooking station, system and method. In one embodiment, the present invention is directed to a cooking station configured to manage food byproduct. The cooking station includes a framework, a griddle, and a grease container. The framework extends to define a front side, a rear side, a left side and a right side each extending between a lower portion and an upper portion. The framework includes multiple heating elements coupled thereto. The heating elements are controlled with control valve knobs positioned along the front side of the framework such that the front side is opposite the rear side of the framework. The griddle is configured to be supported by the upper portion of the framework, the griddle extending to define a cooking surface with a splash guard extending upward from the cooking surface. The cooking surface extends between a left end and a right end and between a front end and a rear end, the griddle being supported by the framework such that the front end and the rear end of the cooking surface correspond with the front side and the rear side of the framework. The griddle defines an opening therein, the opening sized and configured to drain food byproduct therethrough. The grease container is at least partially positioned below the cooking surface of the griddle and below the opening defined in the griddle. The grease container includes a container portion and an extension. The extension is configured to extend upward from the container portion as a free end such that the extension extends to define a top surface configured to be positioned adjacently along an external side of the splash guard.

In another embodiment, the cooking station further includes a hood, the hood pivotably coupled to the hood and configured to be pivoted between an open position and a closed position, wherein, upon the hood being in the open position, the grease container is manually removable from the framework and, wherein upon the hood being in the closed position, the grease container is prevented from being manually removable from the framework. In another embodiment, the grease container is positioned along the rear side of the framework and the griddle such that the grease container is manually removable from a position along the front side of the griddle.

In another embodiment, the framework extends as an insert type framework. In still another embodiment, the framework extends to define a cradle portion along the rear side of the framework, the cradle portion sized and configured to hold the grease container therein. In another embodiment, the framework extends to define a cradle portion along the rear side of the framework, the cradle portion extending to define opposing upward extending flanges to hold the grease container within the cradle portion. In another embodiment, the framework extends to define a cradle portion along the rear side of the framework, the cradle portion disposed within a recess defined in the framework such that the grease container is positionable below the opening defined in the griddle.

In another embodiment, the opening is positioned adjacent the rear end of the cooking surface of the griddle and adjacent the splash guard of the griddle. In still another embodiment, the top surface of the extension acts as a visual indicator.

In accordance with another embodiment of the present invention, a cooking station configured to manage food byproduct. The cooking station includes a base insert, a griddle, and a grease container. The base insert extends to define a front side, a rear side, a left side and a right side each extending between a lower portion and an upper portion of the base insert. The base insert includes multiple heating elements coupled thereto, the heating elements controlled with control valve knobs positioned along the front side of the base insert such that the front side is opposite the rear side of the base insert. The rear side of the base insert defines a recess such that the base insert extends to define a cradle portion positioned within the recess of the base insert. The griddle is configured to be supported by the upper portion of the base insert, the griddle extending to define a cooking surface with a splash guard extending upward from the cooking surface. The cooking surface extends between a left end and a right end and between a front end and a rear end, the griddle being supported by the base insert such that the front end and the rear end correspond with the front side and the rear side of the base insert. The griddle defines a rear opening therein such that the rear opening is positioned adjacent the rear end of the cooking surface and positioned adjacent the splash guard, the rear opening sized and configured to drain food byproduct therethrough. The grease container is at least partially positioned below the cooking surface of the griddle and below the rear opening defined in the griddle. The grease container includes an extension that extends upward from the grease container, the extension including a top end surface that is configured to be positioned adjacently along an external side of the splash guard.

In another embodiment, the cooking station further includes a hood, the hood pivotably coupled to the base insert such that the hood is pivotable between an open position and a closed position, wherein upon the hood being in the open position, the grease container is removable from the rear side of the base insert, wherein upon the hood being in the closed position, the grease container is non-removable from the base insert. In another embodiment, the cradle portion includes two upwardly extending flanges sized and configured to receive the grease container therebetween.

In another embodiment, the rear opening is defined at least partially by the splash guard. In another embodiment, the griddle includes a sloped surface extending directly from the cooking surface so as to extend downward toward the rear opening. In still another embodiment, the extension extends freely upward from the grease container, alongside the splash guard, and without interconnection to the splash guard.

In accordance with another embodiment of the present invention, a method for managing food byproduct produced from cooking food on an outdoor cooking station is provided. The method includes the steps of: cooking food on a cooking surface of a griddle of a cooking station such that the food byproduct drains through an opening defined in the griddle and into a grease container at least partially positioned below the griddle, the grease container having an extension configured to extend to a top surface as a free end of the extension, the top surface acting as a visual indicator such that the top surface is configured to positioned adjacently along a rear external side of a splash guard of the griddle, the cooking station having a hood pivotably coupled thereto such that the hood is pivotable between an open position and a closed position; viewing the visual indicator from a front side of the cooking station with the hood in the open position such that the top surface is positioned adjacently along the rear external side of the splash guard of the griddle; and removing the grease container by manually grasping the extension of the grease container while positioned along the front side of the cooking station and lifting the extension so that the grease container moves upward out of a cradle portion within a recess along a rear side of the cooking station.

In another embodiment, the method further includes the step of preventing removal of the grease container from the cooking station with the hood in the closed position. In another embodiment, the method further includes the step of positioning the grease container within the cradle portion along the rear side of the cooking station while positioned along the front side of the cooking station with the hood in the open position such that the grease container sits between two upward extending flanges so that the grease container nests within the cradle portion.

In accordance with another embodiment of the present invention, a cooking station configured to manage food byproduct is provided. In one embodiment, the cooking station includes an insert type framework for positioning within a cabinet type structure. The cooking station includes a framework, a griddle and a grease container. The framework is made to support the griddle thereon such that the griddle includes a splash guard and an opening positioned adjacent a rear side of the griddle and the splash guard, the opening configured to drain food byproduct therethrough and into the grease container. The grease container includes an upward extension that is unattached so as to extend freely along the rear side of the splash guard. The extension is viewable, while standing along a front side of the griddle, so that the user can readily view, grab and pull the extension to, thereby, pull the grease container up from a cradle positioned below the griddle along a rear side of the framework.

BRIEF DESCRIPTION OF THE SEVERAL VIEWS OF THE DRAWINGS

The foregoing and other advantages of the invention will become apparent upon reading the following detailed description and upon reference to the drawings in which.

DETAILED DESCRIPTION OF THE INVENTION

Figure 1:
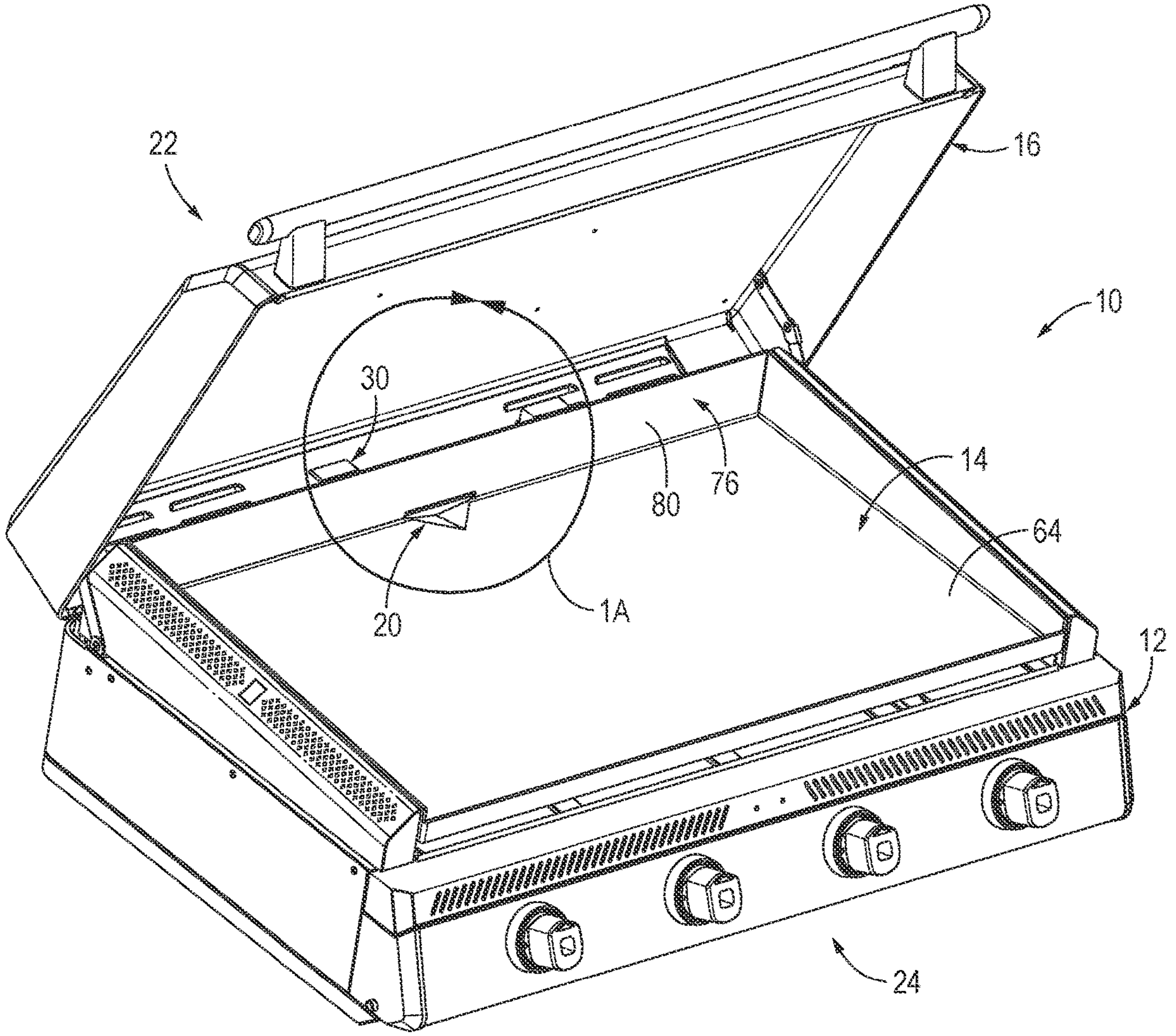
FIG. 1 is a perspective view of an insert type cooking station, depicting the cooking station having a hood and griddle with a rear opening for draining grease from the griddle, according to an embodiment of the present invention.
Figure 1A:
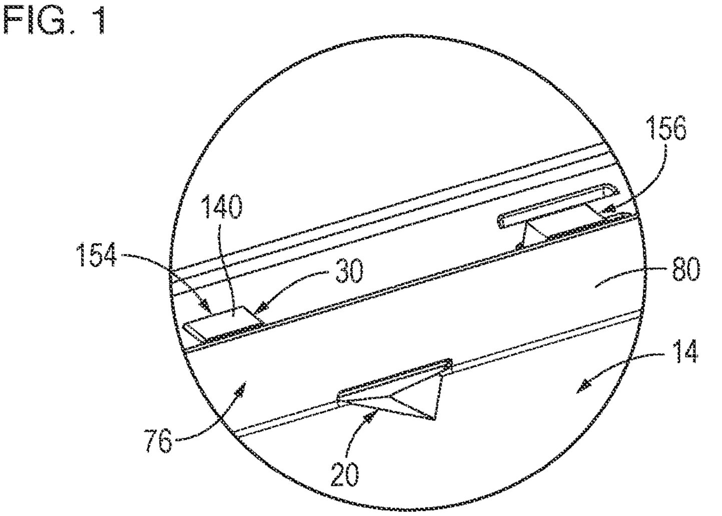
FIG. 1A is an enlarged view of a portion of the insert type cooking station taken from region 1A in FIG. 1, depicting a top surface of an upward extension extending from the grease container, according to another embodiment of the present invention.
Figure 2:
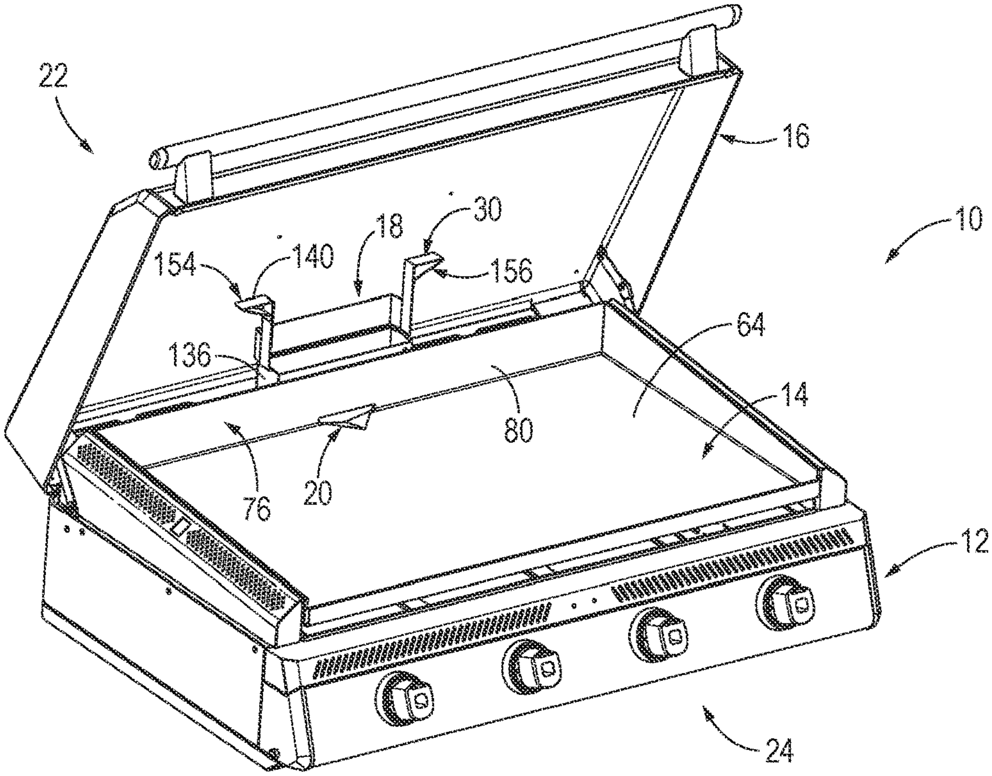
FIG. 2 is a perspective view of the insert type cooking station, depicting the grease container partially removed from a rear side of the insert type cooking station, according to another embodiment of the present invention.
Figure 3:
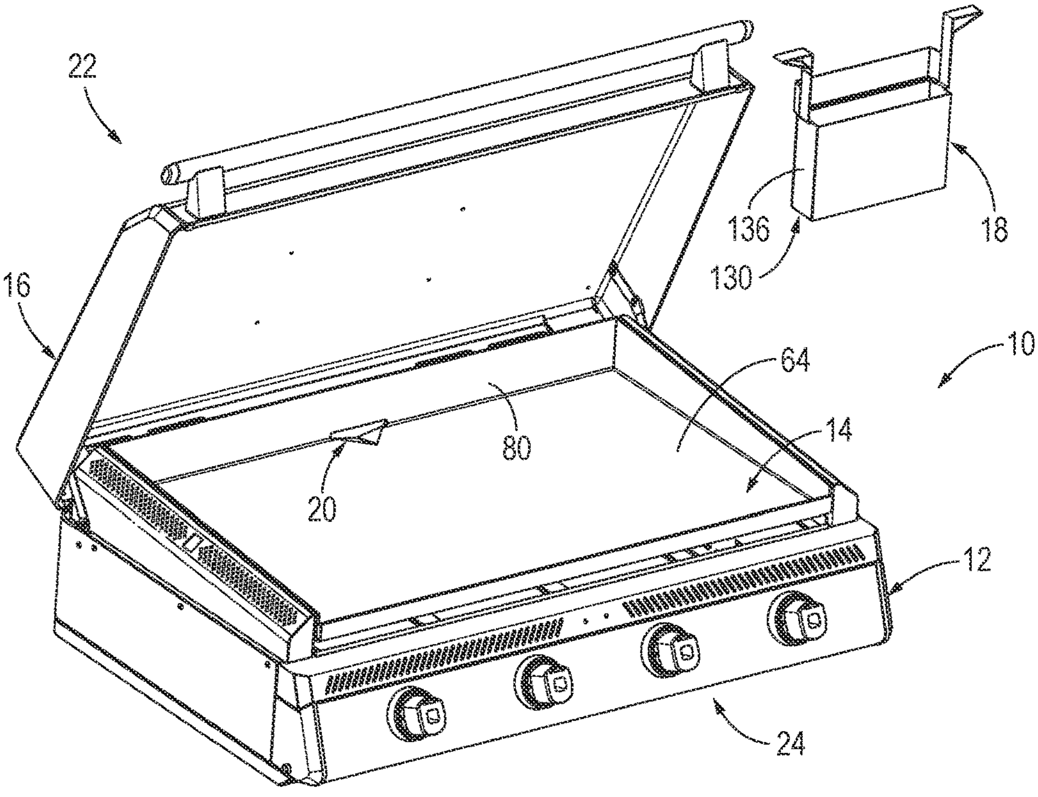
FIG. 3 is a perspective view of the insert type cooking station, depicting the grease container completely removed from the cooking station, according to another embodiment of the present invention.
Figure 7:
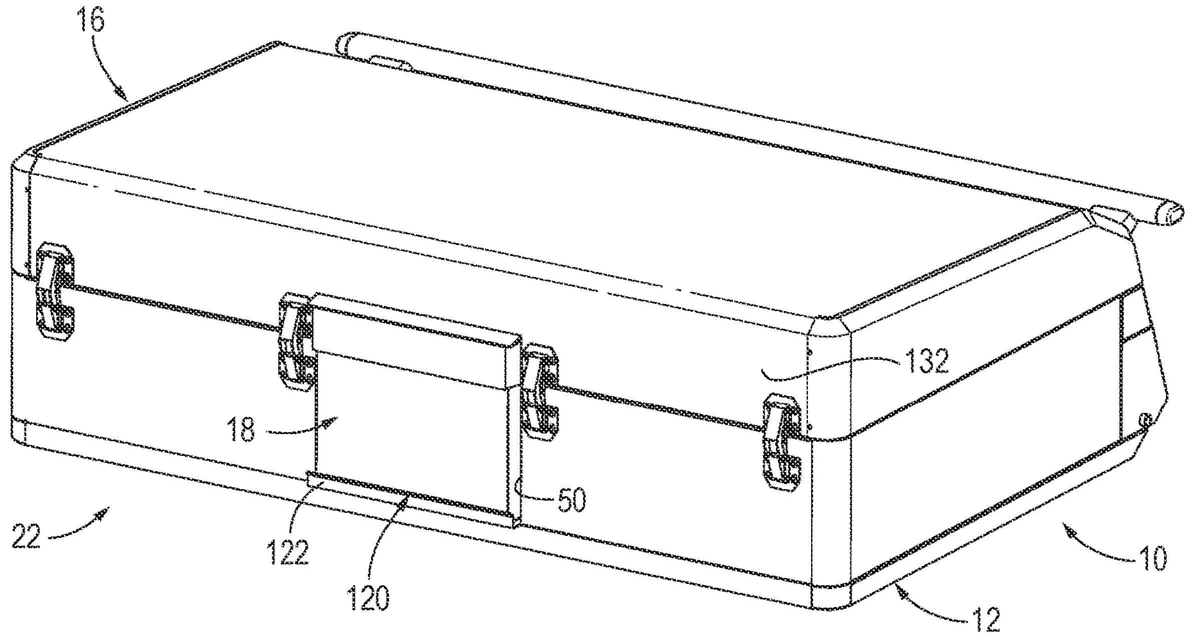
FIG. 7 is a rear perspective view of the insert type cooking station, depicting the cradle with the grease container positioned therein with the hood in the closed position, according to another embodiment of the present invention.
Figure 8:
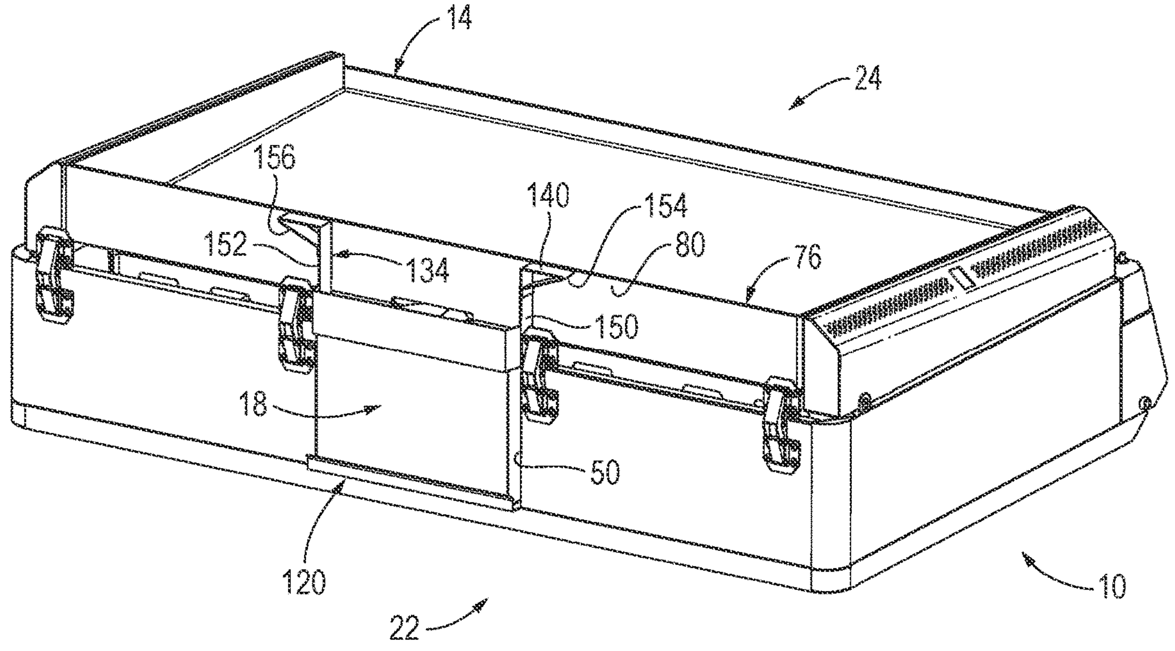
FIG. 8 is a rear perspective view of the insert type cooking station without the hood, depicting a position of the top surface of the upward extension that extends from the grease container and extends along a rear side of the griddle, according to another embodiment of the present invention.

Referring to FIGS. 1-3, an outdoor cooking station 10 with a grease management system is provided. In one embodiment, the outdoor cooking station 10 may be an insert type cooking station sized and configured to typically be positioned within an outdoor cabinet structure (not shown) of an outdoor kitchen or the like. As such, the structure of the outdoor cooking station 10 may be minimized in its portability. The cooking station 10 of this embodiment may include a base insert 12 with a griddle 14 positioned thereon with a hood 16 pivotably coupled to the base insert 12. Also, the cooking station 10 may include structure to be employed with a grease container 18 that may be positioned below an opening 20 defined in the griddle 14 for draining food byproduct, such as grease, through the opening 20. In this embodiment, the grease container 18 may be removed from a rear side 22 of the griddle 14 or base insert 12 while standing along a front side 24 or cook's side of the base insert 12 and while the hood 16 is in an open position. Such removal may be readily facilitated by viewing and then grasping (or lifting) a visual indicator 30 (see FIG. 1A) extending from and above the grease container 18. In this manner, the grease container 18 may be readily accessible for removal from the cooking station 10 so that the grease container 18 may be emptied and cleaned. Further, upon the hood 16 being in a closed position, the grease container 18 may be inaccessible for removal along the rear side 22 of the cooking station 10, as shown in FIGS. 7-8. With this arrangement, the cooking station 10 may readily facilitate cleaning and managing the grease generated from cooking on the cooking station 10.

Figure 4:
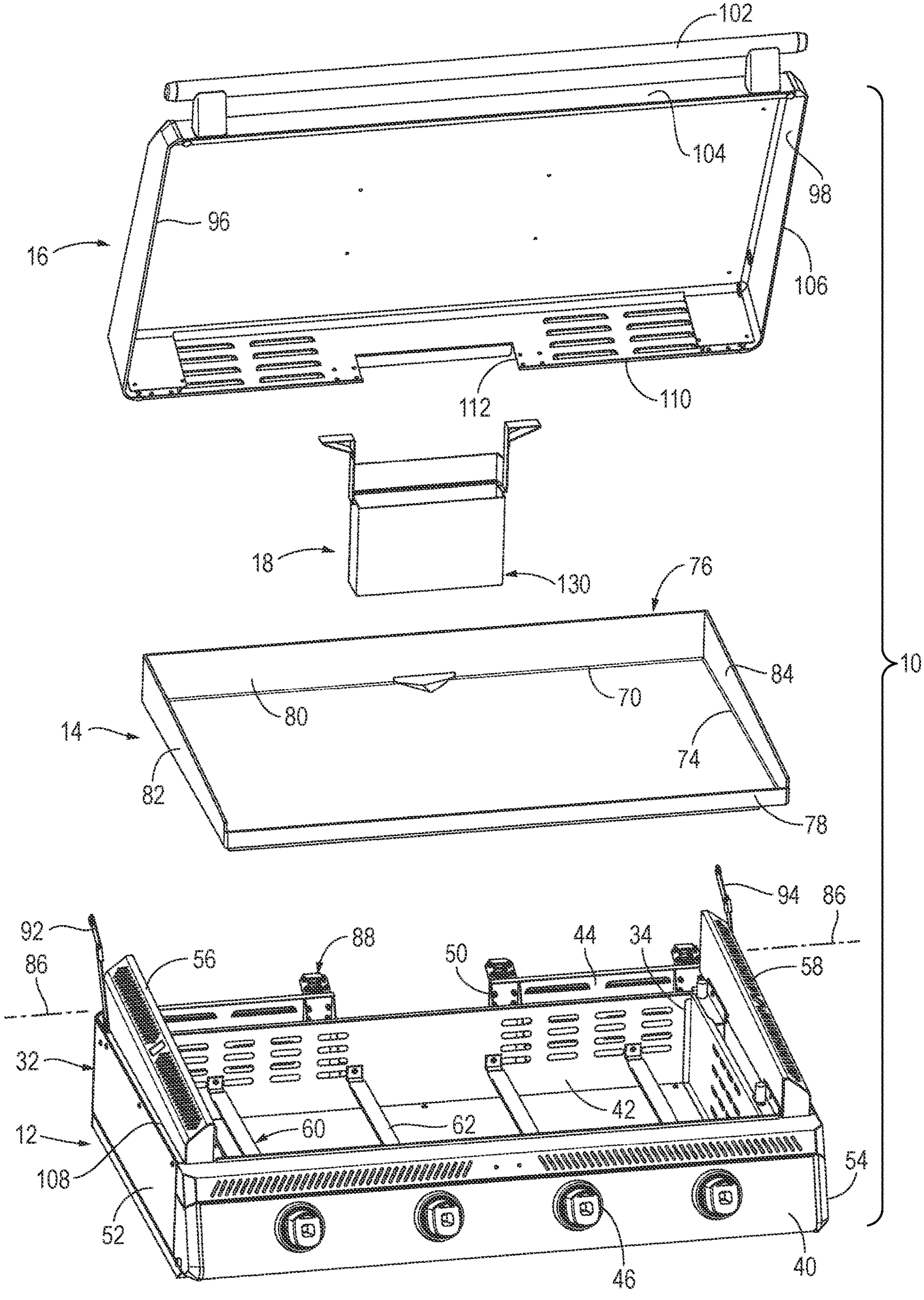
FIG. 4 is a partial exploded view of the insert type cooking station, according to another embodiment of the present invention.
Figure 5:
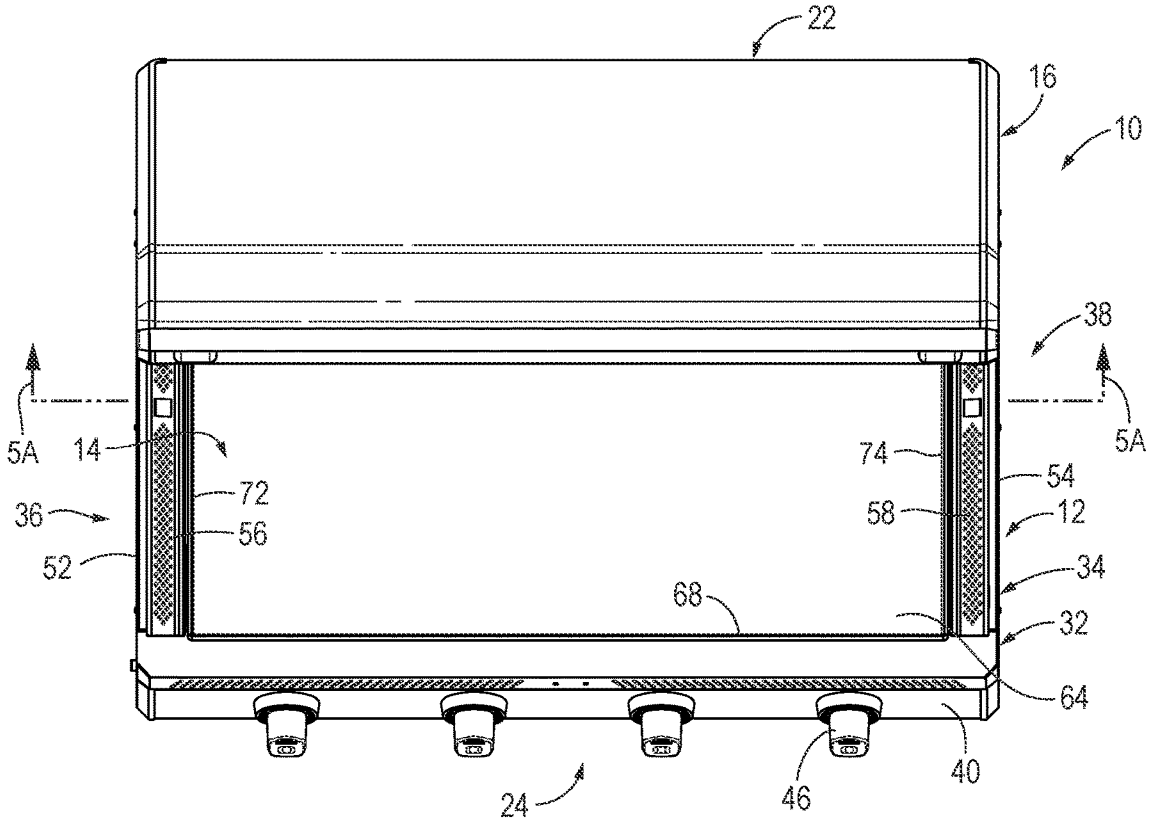
FIG. 5 is a top view of the cooking station, depicting the cooking station with a hood in the open position, according to another embodiment of the present invention.
Figure 5A:
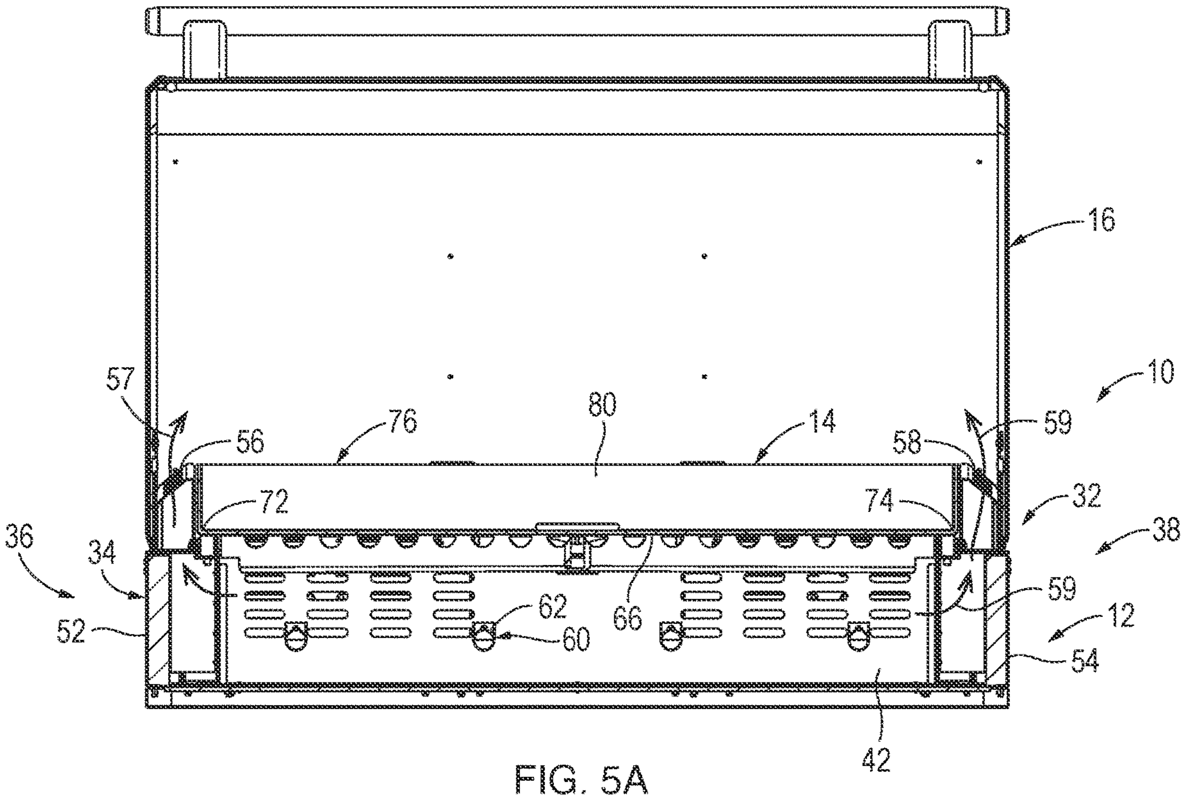
FIG. 5A is a cross-sectional view of the cooking station taken along section line 5A-5A in FIG. 5, according to another embodiment of the present invention.

Now with reference to FIGS. 4, 5 and 5A, as set forth, the cooking station 10 may include, among other things, the base insert 12, the griddle 14, the hood 16 and the grease container 18. In another embodiment, instead of the base insert 12, the cooking station 10 may include a main body and framework sized and configured to be portable such that the main body may extend to legs or the like with wheels to facilitate the portability. In the embodiment depicted herein, the base insert 12 may be sized and configured to receive the griddle 14. The base insert 12 may extend with a main body 32 having a framework 34 and various panels to define the rear and front sides 22, 24, a left side 36 and a right side 38. The rear side 22 may be opposite to the front side 24 and the left side 36 may be opposite to the right side 38 of the base insert 12. Further, at least some of the framework 34 and panels of the front side 24 may extend generally parallel relative to the framework 34 and panels of the rear side 22. Similarly, at least some of the framework 34 and panels of the left side 36 may extend generally parallel relative to the framework 34 and panels of the right side 38. As such, the base insert 12 may have a generally rectangular or square profile viewing the base insert 12 from above or below. Further, each of the above-described sides may extend to define the various panels. For example, the front side 24 may define a front panel 40, the front panel 40 having burner control knobs 46. Other knobs may include an ignitor switch (not shown), lighting switch or any other controllers for the cooking station 10, for example. The front side 24 may also include a front side panel with venting. The rear side 22 may include multiple panels extending with vents therein, such as first and second rear panels 42, 44 that may be positioned to define a recess 50 along the rear side 22 of the base insert 12 (see also FIG. 6), discussed further herein. The left side 36 and right side 38 of the base insert 12 may include respective left and right panels 52, 54 that may generally mirror each other. For example, the left panels 52 and the right panels 54 may extend with venting to facilitate channeling heat into and through left and right baffles 56, 58, as shown by respective arrows 57, 59 in FIG. 5A. Such a baffling system may assist in controlling heat flow for safety reasons as well as to substantially prevent heat fatigue occurring along portions of the hood 16 and other components of the cooking station 10. A similar baffling system is described in commonly assigned U.S. patent application Ser. No. 16/926,681 to Puertas et al., filed Jul. 11, 2020, the disclosure of which is incorporated by reference herein in its entirety.

The base insert may also include multiple heating elements 60, such as four gas burners 62. The gas burners 62 may be supported by the framework 34 and/or panels and may be elongated to extend between paneling along the front side 24 and rear side 22 of the base insert 12. The gas burners 62 may receive gas by rotating the burner control knobs 46 from an off-position to an on-position. Such burner control knobs 46 may be coupled to the front panel 40 of the main body 32 and may each be aligned and associated with a corresponding one of the gas burners 62. Each of the burner control knobs 46 may include the appropriate valves and components associated therewith configured to control gas being supplied to the gas burners 62, as known to one of ordinary skill in the art. Further, the front panel 40 of the main body 32 may also include an igniter switch (not shown). The igniter switch may be sized and configured to ignite the particular gas burners 62 corresponding with the burner control knobs 46 rotated to the on-position. In another embodiment, the ignitor switch may be associated with the gas control knob 46 such that, upon turning the knob, an ignitor may be activated to ignite the gas supplied through the associated gas burner 62, as known to one of ordinary skill in the art. In this manner, the gas burners 62 may be fueled with gas, such as propane gas, with a propane gas tank (not shown) or fueled with natural gas (or any other type of gas) supplied to the cooking station 10, which may be coupled to the gas burners 62 via a gas line and connection valve (not shown) or the like. Although only some of the primary components for operating the cooking station 10 are shown and described herein, the remaining components that may be needed for proper functioning of the cooking station 10 may be incorporated herewith and into the cooking station 10, as known by one of ordinary skill in the art.

The griddle 14 may include a flat extending plate extending with an upper, flat cooking surface 64 and an oppositely facing underside surface 66. The flat extending plate may extend with a generally rectangular or square configuration. Further, the flat cooking surface 64 may extend between a front end 68 and a rear end 70, and a first end 72 and second end 74. The front end 68 may extend parallel with the rear end 70, and the first end 72 may extend parallel with the second end 74. As such, the flat cooking surface 64 may be generally rectangular or square. The griddle 14 may also include a splash guard 76. Such splash guard 76 may extend upward from the flat cooking surface 64 such that the splash guard 76 may define a front wall 78, a rear wall 80, a first wall 82 and a second wall 84. The front wall 78 may extend upward from the front end 68 of the cooking surface 64 and the rear wall 80 may extend upward from the rear end 70 of the cooking surface 64. Similarly, the first wall 78 may extend upward from the first end 72 of the cooking surface 64 and the second wall 84 may extend upward from second end 74 of the cooking surface 64. In some embodiments, the splash guard 76 may extend continuously along each side or end of the cooking surface 64. In another embodiment, the rear end 70 and/or the rear wall 80 may at least partially extend to or define the opening 20, the opening 20 sized and configured to drain grease and food byproduct from the cooking surface 64 and through the opening 20. In another embodiment, the opening 20 may be positioned adjacent to the rear end 70 and/or the rear wall 80. Such opening 20 may be referenced as a rear opening and may be employed for managing grease generated on the griddle 14 while cooking thereon. A similar griddle is also described in commonly assigned U.S. patent application Ser. No. 16/231,384, filed Dec. 21, 2018, now issued as U.S. Pat. No. 10,327,589, the disclosure of which is incorporated by reference herein in its entirety.

Figure 6:
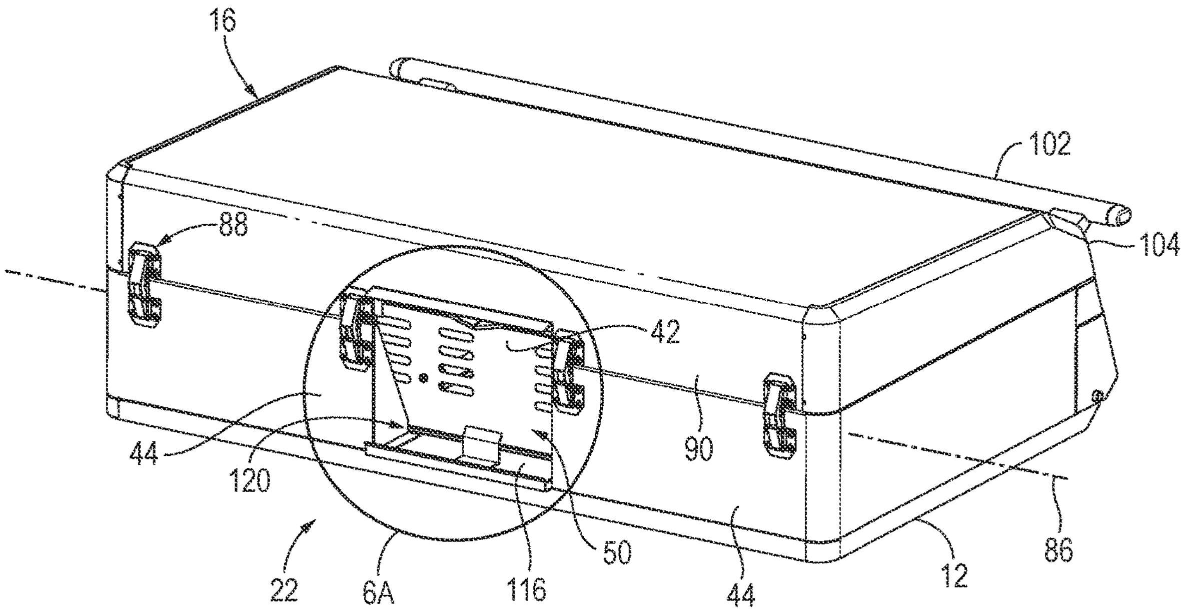
FIG. 6 is a rear perspective view of the insert type cooking station, depicting a cradle for holding the grease container, according to another embodiment of the present invention.

With reference to FIGS. 4 and 6, the cooking station 10 may also include the hood 16. The hood 16 may be pivotably coupled the cooking station 10, such as the base insert 12. In another embodiment, the hood 16 may be coupled to the griddle 14. In still another embodiment, the hood 16 may not be coupled to the cooking station 10 so as to be positionable over the cooking station 10, and be manually removable therefrom. In some embodiments, the hood 16 may be pivotably coupled to the base insert 12 so as to pivot about a rear axis 86 with hinges 88 coupled to one of the rear panels, such as the second rear panel 44 and a rear side surface 90 of the hood 16. With this arrangement, the hood 16 may be moved between a closed position and an open position, the open position being any one of a fully open position and multiple partially open positions. In addition, the hood 16 may be moved between its closed and open positions with additional first and second supporting links 92, 94. The first and second supporting links 92, 94 may be coupled between respective left and right panels 52, 54 and respective first and second inner surfaces 96, 98 of the hood 16. Such hood 16 may include a handle 102. The handle 102 may extend along a front side surface 104 of the hood 16. Further, in the closed position, the hood 16 may be sized and configured to enclose the griddle 14. Even further, in the closed position, the hood 16 may be sized and configured to enclose the griddle 14 and the left and right baffles 56, 58 extending upward along left and right sides 36, 38 of the griddle 14. In another embodiment, the hood 16 may include a lower peripheral edge 106 that may be sized and configured to sit flush over an upper edge 108 of the base insert 12. The lower peripheral edge 106 may extend to define a rear lower peripheral edge 110 that may extend with a cut-out section 112 defined therealong. Such cut-out section 112 may be sized slightly larger, but to generally correspond with dimensions of a top side profile of the grease container 18. As previously set forth, upon the hood 16 being in the closed position, the grease container 18 is not readily removable from any side of the cooking station 10, unless one was to remove or adjust a portion of the hood 16 or a portion of the rear panels or the like from the cooking station 10. Further, upon the hood 16 being in the open position, the grease container 18 is removable from the front side 24 of the cooking station 10.

Now with reference to FIGS. 4, 6, 6A, and 7, the grease container 18 may be sized and configured to be positioned along the rear side 22 of the cooking station 10. As previously set forth, the rear side 22 of the base insert 12 may include the first and second rear panels 42, 44. The first and second rear panels 42, 44 may be connected with lateral extensions 114 so as to define the recess 50 or cubby hole along the rear side 22 of the base insert 12. Further, the recess 50 defined by the first and second rear panels 42, 44 and lateral extensions 114 may include a floor panel 116 and a cradle portion 120. The floor panel 116 may extend between the lateral extensions 114 and the first rear panel 42. The cradle portion 120 may be sized and configured to hold the grease container 18 therein in a nesting manner. For example, the cradle portion 120 may include a first flange 122 and a second flange 124. The first flange 122 may be elongated and may extend from one end of the floor panel 116 and extend upward. Further, the first flange 122 may include a first angled portion 126 that may be angled rearwardly or outward relative to the second rear panel 44 to assist in capturing or receiving a bottom end portion 130 of the grease container 18. The second flange 124 may be spaced from the first flange 122 and may extend upward from the floor panel 116. Further, the second flange 124 may extend with a second angled portion 128 that may extend inward and upward toward the first rear panel 42. With this arrangement, the first and second angled portions 126, 128 of the cradle portion 120 may be sized and configured to readily capture and receive the grease container 18. Further, the cradle portion 18 within the recess 50 of the base insert 12 may at least partially support the grease container 18 to be held in an upright position within the recess 50.

Figure 6A:
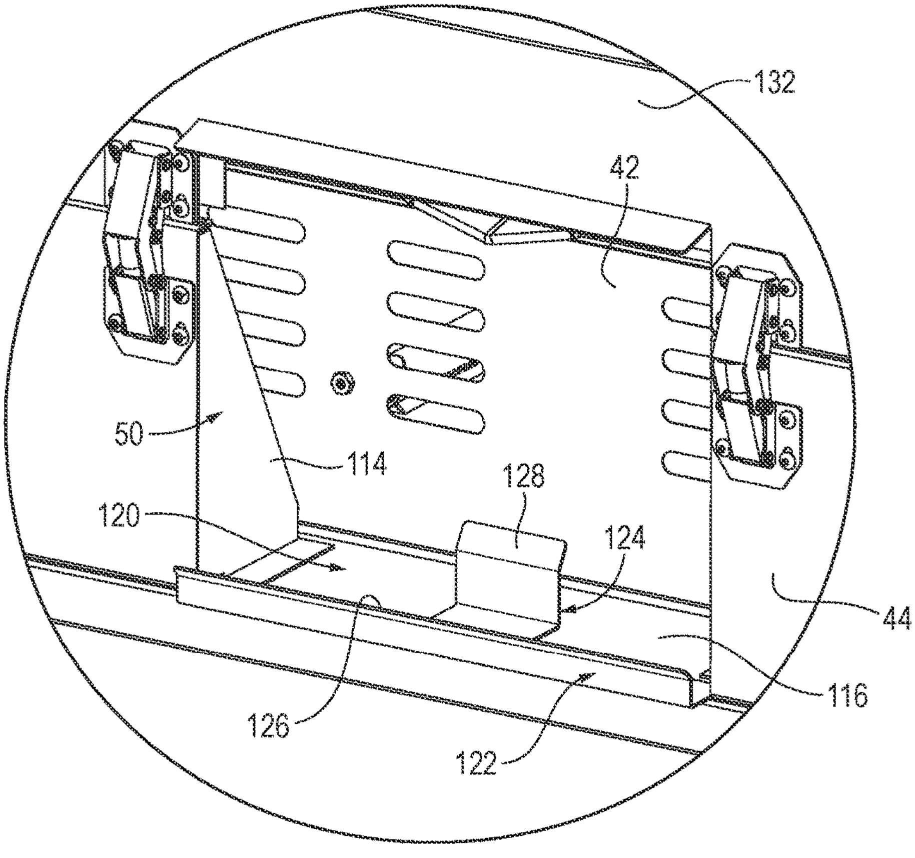
FIG. 6A is an enlarged view of a portion of the insert type cooking station taken from region 6A in FIG. 6, according to another embodiment of the present invention.

Further, as depicted in FIGS. 6A, 7 and 8, upon the grease container 18 being positioned within the cradle portion 120 and the recess 50, the grease container 18 may not be removable from the cooking station 10 when the hood 16 is in the closed position due to upward extensions 134 of the grease container 18. As depicted, the upward extensions 134 may extend to be positioned between the rear wall 80 of the splash guard 76 and a wall 132 of the hood 16. In this manner, such upward extensions 134 may to some degree substantially prevent the grease container 18 from being removed or becoming askew from the cradle portion 120 along the rear side 22 when the hood 16 is in the closed position. In some embodiments, the cooking station may be a portable cooking station such that it is advantageous for the user to be able to make the grease container substantially inaccessible and non-removable upon closing the hood. Likewise, it is advantageous for the user to be able to make the grease container removable by simply opening the hood so that the upward extensions are viewable from the front side to readily be removable from the rear side while standing on the front side of the griddle. In this manner, upon the hood 16 being positioned in the open position, the upward extensions 134 facilitate removal of the grease container 18 from the front side 24 of the cooking station 10, as previously set forth.

Now with reference to FIGS. 9 and 10, the components of the grease container 18 will now be described. In one embodiment, the grease container 18 may include a container portion 136, the upward extensions 134, a support portion 138, and the visual indicator 30. The visual indicator 30 may include a lateral component with a top surface 140. The container portion 136 may be sized and configured to be positioned within the recess 50 and cradle portion 120 along the rear side 22 of the base insert 12 (see FIGS. 6 and 6A). The container portion 136 may extend with a narrow profile having box shape with one open side along a top side thereof, upon the grease container 18 being in an upright use position, as depicted. For example, the container portion 18 may define a depth 142, a width 144 and a height 146, the depth 142 dimension being smaller than the width 144 and the height 146 dimensions of the container portion 136. The container portion 136 may engage the first and second flange portions 122, 124 along the bottom end portion 130 of the container portion 136 such that the first and second flange portions 122, 124 may extend along opposing sides of the container portion 136 at the bottom end portion 130 thereof (see FIG. 6A). The container portion 136 may define an upper edge 148 that defines the open side of the container portion 136. The grease container 18 may include first and second upward extensions 150, 152 that extend upward above the upper edge 148 of the container portion 136. In one embodiment, the grease container 18 may include a single upward extension. In another embodiment, the grease container 18 may include more than two upward extensions 134. The first and second upward extensions 150, 152 may extend upward from opposing sides of the container portion 136. The first and second upward extensions 150, 152 may include the support portion 138 or support band that may extend between portions of the first and second upward extensions 150, 152. The support portion 138 may assist in maintaining the first and second upward extensions 150, 152 in an upright orientation. The first and second upward extensions 150, 152 may extend upward to respective first and second lobes 154, 156. Each of the first and second lobes 154, 156 may include the top surface 140 of which may act as the visual indicator 30, previously discussed herein. The first and second lobes 154, 156 may extend laterally and transversely relative to the respective first and second upward extensions 150, 152. The first lobe 154 may extend laterally outward from one end of the first upward extension 150 to define the top surface 140 of the first lobe 154. Similarly, the second lobe 156 may extend laterally outward from one end of the second upward extension 152 to define the top surface 140 of the second lobe 156.

Figure 9:
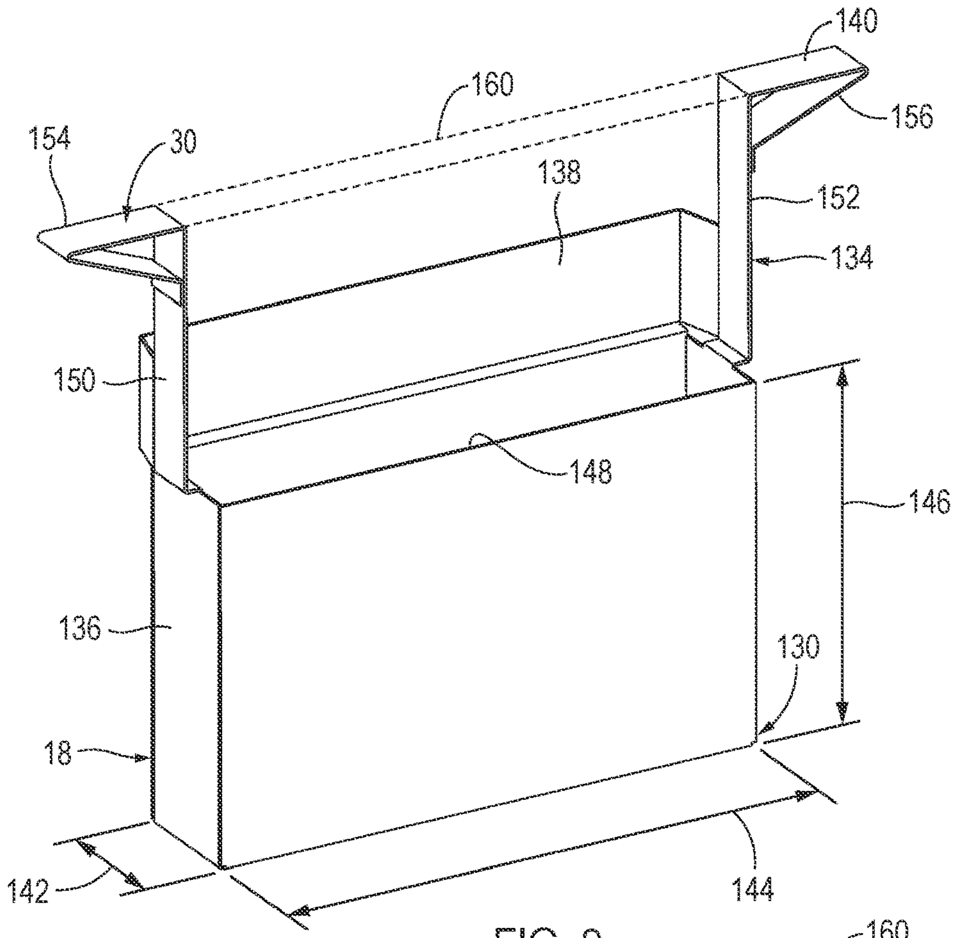
FIG. 9 is a front perspective view of the grease container, according to another embodiment of the present invention.

With reference to FIGS. 7, 8 and 9, as set forth, the top surface 140 of one or both of the first and second lobes 154, 156 may act as a visual indicator 30. Such first and second upward extensions 150, 152 and corresponding first and second lobes 154, 156 may be positioned between the rear wall 80 of the splash guard 76 and a portion of the hood 16, such as the wall 132 of the hood 16 when the hood 16 is in a closed position. In one embodiment, the first and second lobes 154, 156 and the respective first and second upward extensions 150, 152 of the grease container 18 do not hang, hook or connect to the rear wall 80 of the splash guard 76 or to the base insert 12. In another embodiment, the first and second lobes 154, 156 extending from the respective first and second upward extensions 150, 152 may be disposed or positioned adjacent to a rear surface of the rear wall 80 of the splash guard 76 of the griddle 14 so as to extend as free end portions of the grease container 18. In this position, the top surface 140 of the first and/or the second lobes 154, 156 may act as the visual indicator 30, as discussed herein.

With reference to FIGS. 1, 1A, 2 and 3, the cooking station 10 provides structure and a method that readily allows manual removal and replacement of the grease container 18 from the rear side 22 of the cooking station 10 while standing or positioned along the front side 24 of the cooking station 10. For example, upon cooking food on the cooking surface 64 of the griddle 14 such that food byproduct drains through the opening 20 and into the grease container 18, the grease container 18 may be removed for discarding the collected food byproduct. Such removal of the grease container 18 may be employed with the hood 16 in the open position. The user may view the top surface 140 of the visual indicator 30, also refenced herein as the top surface 140 of the first and second lobes 154, 156, along the rear side 22 of the rear wall 80 of the splash guard 76, as depicted in FIGS. 1 and 1A. Upon viewing the visual indicator 30, the user may grasp the first and/or second lobes 154, 156 and lift or pull upward to dislodge the container portion 136 from the cradle portion 120 in the recess 50 (FIG. 6) along the rear side 22 of the cooking station 10, as depicted in FIG. 2. The user may then fully remove the grease container 18 from the cooking station 10, as depicted in FIG. 3, to then discard the grease and clean out the grease container 18. In some embodiments, the grease container 18 may include a disposable liner (not shown) that may be sized and configured to fit within the container portion 136 so that the grease within the disposable liner may readily be removed to make the cleaning process quicker and more simplified. In another embodiment, once the grease container 18 is cleaned and ready to be positioned back into the cradle portion 120 along the rear side 22 of the cooking station 10, the user may position the hood 16 in the open position. The user may then reach and position the container portion 136 along the rear side 22 of the rear wall 80 of the splash guard 76, similar to that depicted in FIG. 2. The user may then let the container portion 136 drop downward until the visual indicators 30 of the first and second lobes 154, 156 are positioned adjacent the rear side 22 of the rear wall 80 of the splash guard 76, as depicted in FIGS. 1 and 1A. As the container portion 136 drops, the bottom end portion 130 (FIG. 9) of the container portion 136 of the grease container 18 may engage the first and second flanges 122, 124 such that the first and second angled portions 126, 128 of the respective flanges may guide the container portion 136 downward to the appropriate position so that the open side of the container portion sits below the opening 20 defined in the griddle 14 (see FIGS. 6A and 8). In this manner, the user may remove and reposition the grease container 18 from and to the rear side 22 of the cooking station 10 while the hood 16 is in the open position and while the user is positioned along the front side 24 of the cooking station 10.

Figure 10:
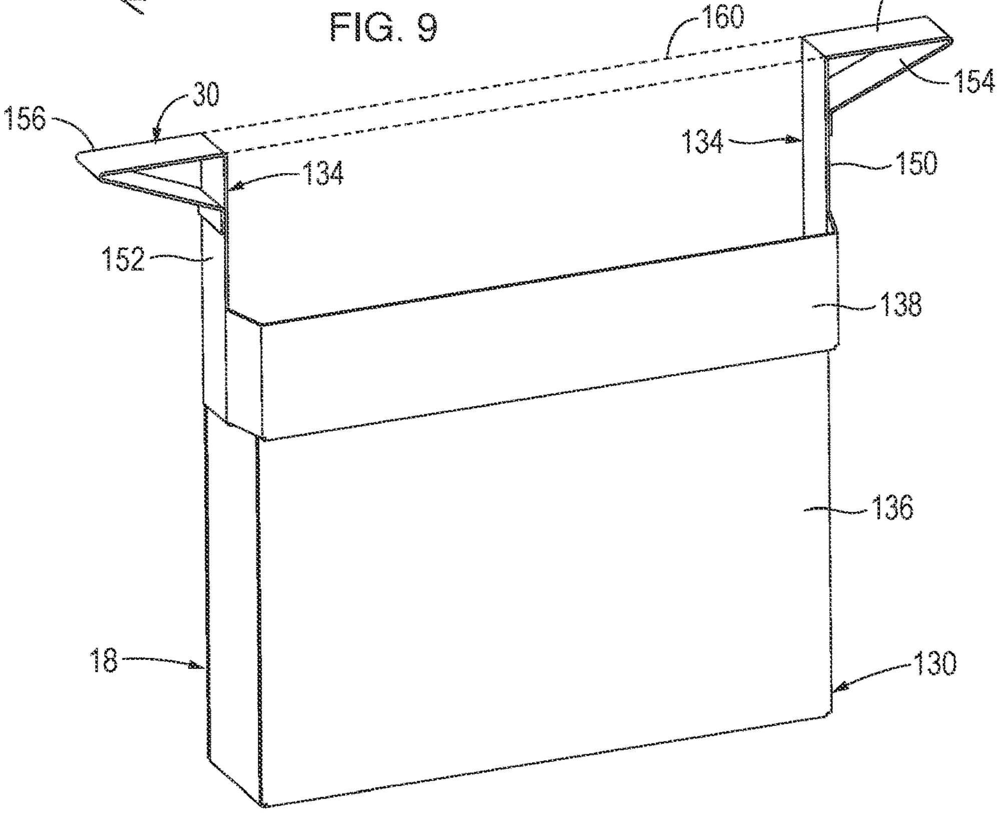
FIG. 10 is a rear perspective view of the grease container, according to another embodiment of the present invention.

With reference to FIGS. 9 and 10, in another embodiment, the grease container 18 may include an interconnection portion 160 (shown in dashed lines). The interconnection portion 160 may extend between the first and second upward extensions 150, 152. The interconnection portion 160 may act as a handle-like structure to assist the user in lifting the grease container 18 from the rear side of the cooking station 10, as described herein and depicted in FIGS. 1-3. Further, the interconnection portion 160 may define an upper surface or top surface which may be a free end of the upward extension 134. Such upper surface or top surface of the interconnection portion 160 of the upward extension 134 may act as a visual indicator to assist the user in determining if the grease container 18 has been appropriately replaced in the cradle portion 120 of the cooking station 10 or for assisting the user to readily grab and lift the grease container 18 from the cradle portion 120 (see FIGS. 1, 2 and 6A). In this embodiment, the grease container 18 may, or may not, include the first and second lobes 154, 156 of the upward extension 134.

While the invention may be susceptible to various modifications and alternative forms, specific embodiments have been shown by way of example in the drawings and have been described in detail herein. Further, the structural features of any one embodiment disclosed herein may be combined or replaced by any one of the structural features of another embodiment set forth herein. However, it should be understood that the invention is not intended to be limited to the particular forms disclosed. Rather, the invention includes all modifications, equivalents, and alternatives falling within the spirit and scope of the invention as defined by the following appended claims.

What is claimed is:

1. A cooking station configured to manage food byproduct, comprising:

a framework extending to define a front side, a rear side, a left side and a right side each extending between a lower portion and an upper portion, the framework including multiple heating elements coupled thereto, the heating elements controlled with control valve knobs positioned along the front side of the framework such that the front side is opposite the rear side of the framework;

a griddle configured to be supported by the upper portion of the framework, the griddle extending to define a cooking surface with a splash guard extending upward from the cooking surface, the cooking surface extending between a left end and a right end and between a front end and a rear end, the griddle being supported by the framework such that the front end and the rear end of the cooking surface correspond with the front side and the rear side of the framework, the griddle defining an opening therein, the opening sized and configured to drain the food byproduct therethrough; and a grease container configured to be at least partially positioned below the cooking surface of the griddle and below the opening defined in the griddle, the grease container including a container portion and an extension, the extension configured to extend upward from the container portion as a free end such that the extension extends to define a top surface configured to be positioned adjacently along an external side of the splash guard;

wherein the extension extends upward from the grease container, alongside the splash guard, and without interconnection to the splash guard.

2. The cooking station of claim 1, further comprising a hood, the hood pivotably coupled to the framework and configured to be pivoted between an open position and a closed position, wherein, upon the hood being in the open position, the grease container is manually removable from the framework and, wherein upon the hood being in the closed position, the grease container is prevented from being manually removable from the framework.

3. The cooking station of claim 2, wherein, upon the hood being in the open position, the grease container is positioned along the rear side of the framework and the griddle such that the grease container is manually removable by a person standing along the front side of the griddle.

4. The cooking station of claim 1, wherein the framework extends as an insert type framework.

5. The cooking station of claim 1, wherein the framework extends to define a cradle portion along the rear side of the framework, the cradle portion sized and configured to hold the grease container therein.

6. The cooking station of claim 1, wherein the framework extends to define a cradle portion along the rear side of the framework, the cradle portion extending to define opposing upward extending flanges to hold the grease container within the cradle portion.

7. The cooking station of claim 1, wherein the framework extends to define a cradle portion along the rear side of the framework, the cradle portion disposed within a recess defined in the framework such that the grease container is positionable below the opening defined in the griddle.

8. The cooking station of claim 1, wherein the opening is positioned adjacent the rear end of the cooking surface of the griddle and adjacent the splash guard of the griddle.

9. The cooking station of claim 1, wherein the top surface of the extension acts as a visual indicator.

10. A cooking station configured to manage food byproduct, comprising:

a base insert extending to define a front side, a rear side, a left side and a right side each extending between a lower portion and an upper portion, the base insert including multiple heating elements coupled thereto, the heating elements controlled with control valves positioned along the front side of the base insert such that the front side is opposite the rear side of the base insert, the rear side of the base insert defines a recess such that the base insert extends to define a cradle portion positioned within the recess of the base insert;

a griddle configured to be supported by the upper portion of the base insert, the griddle extending to define a cooking surface with a splash guard extending upward from the cooking surface, the cooking surface extending between a left end and a right end and between a front end and a rear end, the griddle being supported by the base insert such that the front end and the rear end correspond with the front side and the rear side of the base insert, the griddle defining a rear opening therein, the rear opening positioned adjacent the rear end of the cooking surface and positioned adjacent the splash guard, the rear opening sized and configured to drain the food byproduct therethrough; and a grease container configured to be at least partially positioned below the cooking surface of the griddle and below the rear opening defined in the griddle so as to be positioned in the cradle portion defined in the base insert, the grease container including an extension that extends upward from the grease container, the extension including a top end surface that is configured to be positioned adjacently along an external side of the splash guard;

wherein, upon the grease container being positioned within the cradle portion, the extension extends upward from the grease container, alongside the splash guard, and without interconnection to the splash guard.

11. The cooking station of claim 10, further comprising a hood, the hood pivotably coupled to the base insert such that the hood is pivotable between an open position and a closed position, wherein upon the hood being in the open position, the grease container is removable from the rear side of the base insert, wherein upon the hood being in the closed position, the grease container is non-removable from the base insert.

12. The cooking station of claim 10, wherein the cradle portion comprises two upwardly extending flanges sized and configured to receive the grease container therebetween.

13. The cooking station of claim 10, wherein the rear opening is defined at least partially by the splash guard.

14. The cooking station of claim 10, wherein the griddle comprises a sloped surface extending directly from the cooking surface so as to extend downward toward the rear opening.

* * * * *